(12) United States Patent
Flint et al.

(10) Patent No.: US 11,058,997 B2
(45) Date of Patent: Jul. 13, 2021

(54) GRAPHENE MEMBRANE AND METHOD FOR MAKING GRAPHENE MEMBRANE

(71) Applicant: 2599218 ONTARIO INC., Toronto (CA)

(72) Inventors: Ian Flint, Bedford (CA); Nifemi Oguntuase, Dartmouth (CA)

(73) Assignee: 2599218 ONTARIO INC., Toronto (CA)

(*) Notice: Subject to any disclaimer, the term of this patent is extended or adjusted under 35 U.S.C. 154(b) by 18 days.

(21) Appl. No.: 16/542,456

(22) Filed: Aug. 16, 2019

(65) Prior Publication Data

US 2021/0046430 A1 Feb. 18, 2021

(51) Int. Cl.
| | | |
|---|---|---|
| B01D 71/02 | (2006.01) | |
| B01D 67/00 | (2006.01) | |
| B01D 69/12 | (2006.01) | |
| B01D 69/10 | (2006.01) | |

(52) U.S. Cl.
CPC ....... *B01D 71/021* (2013.01); *B01D 67/0069* (2013.01); *B01D 69/105* (2013.01); *B01D 69/12* (2013.01)

(58) Field of Classification Search
CPC ............. B01D 67/0069; B01D 71/021; B01D 69/105; B01D 69/12
See application file for complete search history.

(56) References Cited

U.S. PATENT DOCUMENTS

| | | |
|---|---|---|
| 3,457,171 A | 7/1969 | Flowers et al. |
| 8,361,321 B2 | 1/2013 | Stetson et al. |
| 8,871,296 B2 | 10/2014 | Zhamu et al. |
| 9,095,823 B2 | 8/2015 | Fleming |
| 10,201,784 B2 * | 2/2019 | Stoltenberg ........ B01D 67/0081 |
| 2013/0270188 A1 | 10/2013 | Karnik et al. |
| 2014/0151288 A1 | 6/2014 | Miller et al. |
| 2015/0258506 A1 | 9/2015 | Mi et al. |
| 2016/0280563 A1 | 9/2016 | Raveendran-Nair et al. |
| 2016/0297693 A1 | 10/2016 | Raveendran-Nair et al. |

(Continued)

FOREIGN PATENT DOCUMENTS

| | | | |
|---|---|---|---|
| KR | 20180000781 A * | 1/2018 | |
| WO | WO-2014152407 A1 * | 9/2014 | ............... B32B 3/00 |
| WO | 2020000086 A1 | 1/2020 | |

OTHER PUBLICATIONS

Zhu et al. "Membranes prepared from graphene-based nanomaterials for sustainable applications: a review", Environ. Sci. Nano., 2017, 4, 2267-2285.

(Continued)

*Primary Examiner* — Ana M Fortuna
(74) *Attorney, Agent, or Firm* — ABM Intellectual Property Inc.; Adrienne Bieber McNeil

(57) ABSTRACT

A membrane includes a porous polymer substrate, and at least a first layer of graphene platelets supported by the substrate. The graphene platelets of the first layer include aminated graphene platelets. A method for making a membrane includes providing a porous polymer substrate, providing a first suspension of graphene platelets in a fluid, wherein the graphene platelets of the first suspension are aminated graphene platelets, and applying the first suspension to the substrate to deposit a layer of the aminated graphene platelets on the substrate.

12 Claims, 1 Drawing Sheet

(56) References Cited

U.S. PATENT DOCUMENTS

| | | |
|---|---|---|
| 2016/0310908 A1 | 10/2016 | Yu |
| 2016/0339160 A1* | 11/2016 | Bedworth ............ B01D 71/021 |
| 2017/0036911 A1 | 2/2017 | Swett et al. |
| 2017/0040082 A1 | 2/2017 | Swett et al. |
| 2017/0174537 A1 | 6/2017 | Zheng et al. |
| 2020/0016547 A1* | 1/2020 | Zheng ................. B01D 69/125 |

OTHER PUBLICATIONS

Gongping Liu, Wanqin Jin, Nanping Xu; Graphene-based Membranes; Chemical Society Reviews; 2015; 00, 1-10.

Study of Ion and Solvent Transport through Graphene Oxide Membranes; Kai Wang; A thesis presented to the University of Waterloo in fulfillment of the thesis requirement for the degree of Master of Science in Chemistry; Waterloo, Ontario, Canada, 2016.

Yi Han, Zhen Xu, Chao Gao; "Ultrathin Graphene Nanofiltration Membrane for WaterPurification"; Advanced Functional Materials; 2013;23,3693-3700.

* cited by examiner

GRAPHENE MEMBRANE AND METHOD FOR MAKING GRAPHENE MEMBRANE

FIELD

This document relates to membranes, for example for use in filters and filtration. More specifically, this document relates to graphene membranes, and to methods for making graphene membranes.

BACKGROUND

US Patent Application Publication No. 2016/0339160 A1 discloses various systems and methods relating to two-dimensional materials such as graphene. A membrane includes a cross-linked graphene platelet polymer that includes a plurality of cross-linked graphene platelets. The cross-linked graphene platelets include a graphene portion and a cross-linking portion. The cross-linking portion contains a 4 to 10 atom link. The cross-linked graphene platelet polymer is produced by reaction of an epoxide functionalized graphene platelet and a (meth)acrylate or (meth)acrylamide functionalized cross-linker.

SUMMARY

The following summary is intended to introduce the reader to various aspects of the detailed description, but not to define or delimit any invention.

According to some aspects a membrane includes a porous polymer substrate, and at least a first layer of graphene platelets supported by the substrate. The graphene platelets of the first layer include aminated graphene platelets.

In some examples, the first layer is directly on the substrate.

In some examples, the membrane further includes at least a second layer of graphene platelets on the first layer of graphene platelets. The graphene platelets of the second layer can include hydroxylated graphene platelets. The graphene platelets of the second layer can include hydrogenated graphene platelets. The graphene platelets of the second layer can include non-functionalized graphene platelets.

In some examples, the porous substrate includes a polysulfone. The polysulfone can have pores with a pore size of less than 0.03 microns. The polysulfone can be an acid-treated polysulfone.

In some examples, the membrane includes ions intercalated within the first layer.

According to some aspects, a method for making a membrane includes: a. providing a porous polymer substrate; b. providing a first suspension of graphene platelets in a fluid, wherein the graphene platelets of the first suspension are aminated graphene platelets; and c. applying the first suspension to the substrate to deposit a layer of the aminated graphene platelets on the substrate.

In some examples, step a. includes providing a precursor porous polymer substrate, and treating the precursor porous polymer substrate with an acid to yield the porous polymer substrate. In some examples, the precursor porous polymer substrate is polysulfone, and the acid is sulfuric acid.

In some examples, step b. includes providing hydroxylated graphene platelets, and treating the hydroxylated graphene platelets with an amine to yield the aminated graphene.

In some examples, the fluid is a liquid and step c. includes forcing the fluid through the porous polymer substrate while retaining the aminated graphene platelets on the substrate.

In some examples, the method further includes providing a second suspension of graphene platelets in a fluid, wherein the graphene platelets of the second suspension are hydroxylated graphene platelets; and applying the second suspension to the substrate to deposit a layer of the hydroxylated graphene platelets on the layer of aminated graphene platelets.

According to some aspects, a method for making a substrate for a graphene membrane includes: a. providing a sheet of a porous polymer; b. treating the sheet of porous polymer with an acid to impart a negative charge to the sheet of porous polymer; and c. treating the charged surface with at least one metal ion.

In some examples, the porous polymer includes polysulfone. In some examples, the polysulfone has pores with a pore size of less than 0.03 microns.

In some examples, the acid includes sulfuric acid.

In some examples, the at least one metal ion includes aluminum or calcium.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes or compositions will be described below to provide an example of an embodiment of the claimed subject matter. No embodiment described below limits any claim and any claim may cover processes or apparatuses or compositions that differ from those described below. The claims are not limited to apparatuses or processes or compositions having all of the features of any one apparatus or process or composition described below or to features common to multiple or all of the apparatuses or processes or compositions described below. It is possible that an apparatus or process or composition described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

Disclosed herein are membranes that include or are made of graphene platelets. For example, the membranes disclosed herein can include one or more layers of graphene platelets on a porous substrate. Also disclosed herein are methods for making membranes with graphene platelets. The membranes disclosed herein can be used, for example, in water filtration and purification. Alternatively, the membranes disclosed herein can be used to form conductive surfaces (e.g. for use in batteries), optionally with intercalated ions on or within those surfaces. The membranes disclosed herein can be water permeable, ion impermeable, and conductive of heat and electricity.

As used herein, the term 'platelet' refers to a structure that includes one or multiple (e.g. at least two and up to nine)

sheets of graphene. Preferably, platelets include one, two, or three sheets of graphene. A platelet can be, for example, up to 15 nanometers thick, with a diameter of up to 100 microns. As used herein, the term 'graphene platelet' can refer to a platelet of pure graphene (i.e. non-functionalized graphene) and/or a platelet of functionalized graphene. Functionalized graphene can include, for example, hydroxylated graphene (also referred to as graphene oxide), aminated graphene, and/or hydrogenated graphene. Functionalization of the graphene can create pores in the graphene, which can allow for flow of filtrates, and can create a desired spacing between graphene sheets. For example, in platelets of non-functionalized graphene, the interlayer spacing may be approximately 0.34 nm. In platelets of functionalized graphene, e.g. graphene that is functionalized as hydroxylated graphene (also known as graphene oxide), the interlayer spacing may be approximately 0.83 nm.

Figure 1A:
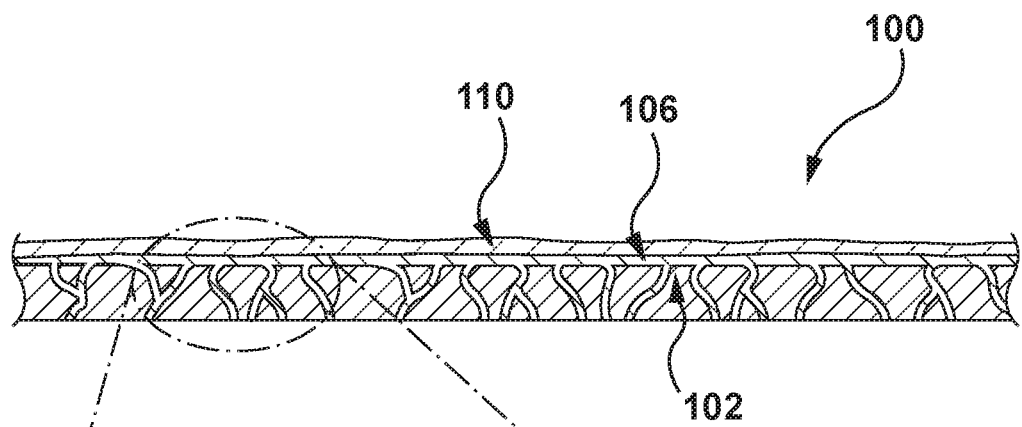
FIG. 1A is a schematic view of an example membrane.
Figure 1B:
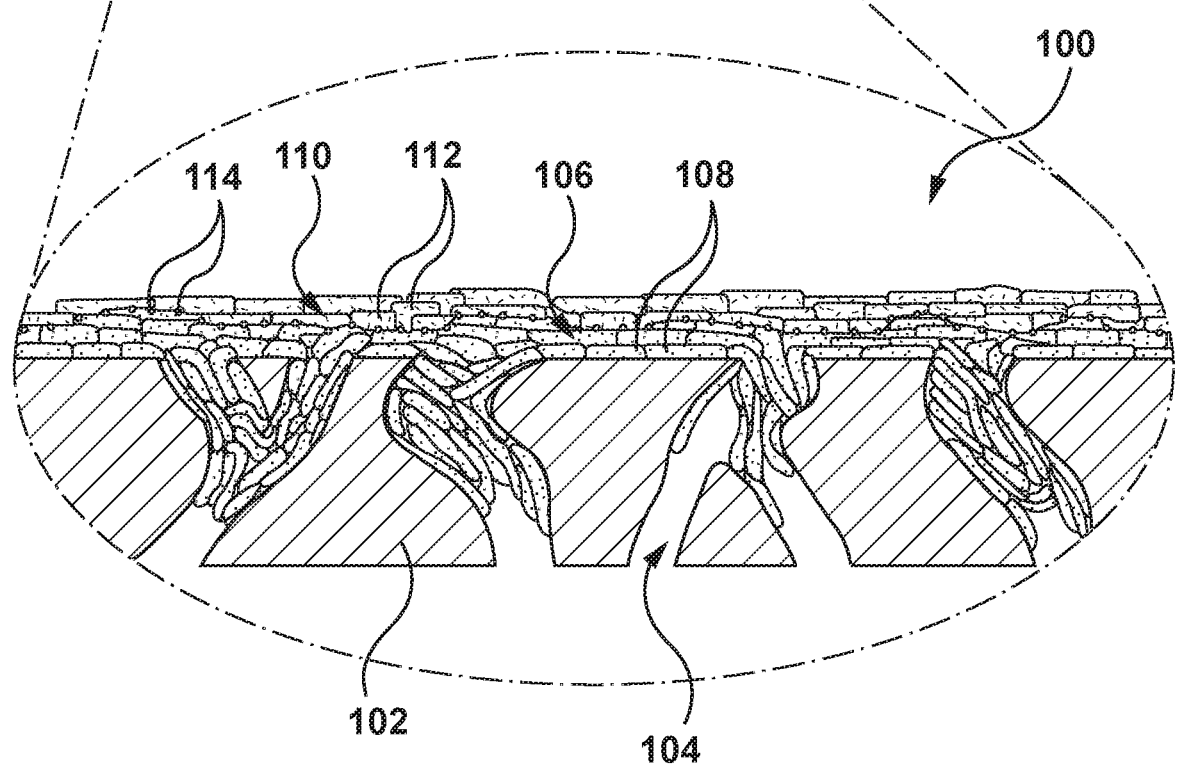
FIG. 1B is an enlarged view of the encircled area in FIG. 1A.

Referring to FIGS. 1A and 1B, a first example of a membrane 100 is shown. The membrane 100 includes a substrate 102, which is porous. The pores 104 (shown in FIG. 1B, only one of which is labelled) can have a diameter of, for example, less than or equal to 0.03 microns. The substrate 102 can have a thickness of, for example, less than 1 mm. In some examples the substrate 102 is a polymer, such as but not limited to polytetrafluoroethylene (Teflon®), polysulfone (PsF) (also referred to as polyether sulfone), cellulose, and/or polyester. In some examples, the substrate 102 is an acid-treated polymer, for example polysulfone treated with sulfuric acid. In some examples, the substrate 102 is an acid-treated and ion-treated polymer, for example polysulfone may be treated with sulfuric acid and then with a solution of metal ions (e.g. aluminum or calcium ions). In examples wherein the polymer is treated with acid and or ions, the polymer, prior to the treatment, may be referred to as a "precursor substrate". Treatment with acid can impart a negative charge to the substrate 102, which can facilitate adhering of the graphene platelets to the substrate 102, as described below.

In one particular example, the substrate 102 can be prepared using a sheet of porous polysulfone, 5 wt % sulfuric acid, a metal ion solution, and deionized water. The polysulfone sheet can be rinsed with the deionized water, and then treated with the sulfuric acid at about 80 degrees Celsius for about 30 minutes. The polysulfone can then be treated with the metal ion solution, for about 2 minutes.

Referring still to FIGS. 1A and 1B, the membrane includes a first layer 106 of graphene platelets 108 (only some of which are labelled in FIG. 1B), which is supported by the substrate 102. As used herein, the phrase 'supported by the substrate' includes arrangements in which the first layer 106 is directly on the substrate 102, as well as arrangements in which the first layer 106 is spaced from the substrate 102, e.g. by an intermediate layer. In the example shown the first layer 106 of graphene platelets 108 is directly on the substrate, and the platelets 108 of the first layer 106 cover and partially fill the pores 104 of the substrate 102.

As used herein the term "layer" refers to an arrangement that includes multiple graphene platelets spread over a supporting structure (e.g. the substrate 102). The platelets in the layer can fully or partially cover the supporting structure. A layer can include an orderly arrangement of platelets, or a disorderly arrangement of platelets. The platelets in a layer can all be parallel to each other, or non-parallel to each other. The term "layer" can refer to an arrangement that is only one platelet deep, or multiple platelets deep (as shown).

In the example shown, the graphene platelets 108 of the first layer 106 include aminated graphene. That is, at least some of the platelets 108 of the first layer 106 include graphene that is functionalized with an amine group. Functionalization of the graphene with an amine group can impart a positive charge to the graphene, which can facilitate adhering of the graphene to the negatively charged substrate 102.

In some examples, aminated graphene can be created by treating hydroxylated graphene with an amine. In one specific example, aminated graphene can be made using commercially available hydroxylated graphene platelets, ethanol, ethylenediamine, 1-(3-dimethylaminopropyl)-3-ethylcarbodiimide methiodide (EDC), and de-ionized (DI) water as starting materials. The hydroxylated graphene platelets may be added to the ethanol (e.g. at 0.02 g/mL) and mixed and sonicated for approximately two hours. The ethylenediamine and EDC may then be added to the suspension of hydroxylated graphene (e.g. each at 0.005 g/mL). The suspension may be stirred at room temperature for about 1 hour, and then the aminated graphene platelets may be filtered and washed with DI water, and dried at 80 degrees Celsius.

Referring still to FIGS. 1A and 1B, in the example shown, the membrane includes a second layer 110 of graphene platelets 112 (only some of which are labelled in FIG. 1B), which is on the first layer 106 of graphene platelets 108. In the example shown, the graphene platelets 112 of the second layer 110 include hydroxylated graphene. That is, at least some of the platelets 112 of the second layer 110 include graphene that is functionalized with a hydroxyl group. Functionalization of the graphene with a hydroxyl group can impart a negative charge to the graphene, which can facilitate adhering of the second layer 110 of graphene to the first layer 106 of graphene. The hydroxylated graphene platelets 112 can be commercially available hydroxylated graphene platelets, or can be made from pristine graphene platelets.

In some examples (not shown), instead of hydroxylated graphene, the second layer 110 can include hydrogenated graphene or pristine (i.e. non-functionalized) graphene.

In some examples, the membrane 100 may include ions. The ions can include trivalent ions such as $Al^{3+}$, bivalent ions such as $Ca^{2+}$, or ions of other valencies. The ions can cross-link the platelets, to stabilize the membrane 100. Alternatively, rather than or in addition to being intercalated between platelets within a layer, the ions can be applied as a coating on a given layer of graphene or between two layers of graphene. In the example shown, ions 114 (only some of which are labelled) are between the first layer 106 and second layer 110.

In some examples, in addition to or as an alternative to ions, molecules or other particulates can be deposited on the surface of the membrane 100 or within the graphene layers of the membrane, in order to create cavities in the membrane, adjust the spacing of the platelets or layers, or to create a desired chemical reaction.

In general, in order to fabricate the membrane 100, suspensions of the graphene platelets can be applied to the porous polymer substrate 102, so that the graphene platelets are retained on the substrate and are deposited on the substrate to form a layer of graphene platelets on the substrate. The suspending fluid can either filter through the porous substrate 102, leaving graphene platelets behind on the substrate 102, or can be drained off the substrate 102 after the graphene platelets settle on the substrate. The suspensions can be applied serially, to build up layers of graphene platelets on the substrate 102.

The suspending fluid can be a liquid or a gas. For example, the suspending fluid can be or can include a liquid, such as water, an alcohol, and/or an organic solvent (e.g. N-Methyl-2-pyrrolidone (NMP)). Alternatively, the suspending fluid can be or can include a gas, such as nitrogen gas, water vapor, and/or hydrogen gas.

The suspending fluids can optionally contain dissolved ions, which become entrapped within the layers of graphene as the graphene platelets are deposited and as suspending fluid passes through the substrate 102. The entrapped ions can stabilize and/or cross-link the platelets, create and maintain a desired spacing between the graphene platelets.

The suspension can be applied to the substrate 102 in various ways, such as by spraying, painting, or settling. In some examples, a pressure differential is applied to force the suspending fluid through the substrate 102.

In one general example, in order to fabricate the membrane 100, the porous polymer substrate 102 is prepared as described above, by treating a precursor polymer substrate with acid and ions, to yield a negatively charged substrate. Aminated graphene and hydroxylated graphene are also prepared as described above, and are each suspended in a respective suspending fluid. The suspension of aminated graphene platelets 108 can be applied to the substrate 102 and the suspension can be allowed to filter through the substrate 102, to deposit a layer of aminated graphene platelets 108 on the substrate 102. The suspension of hydroxylated graphene platelets can then be applied to the layer 106 of aminated graphene platelets 108 and the suspension can be allowed to filter through the layer 106 of aminated graphene platelets 108 and the substrate 102, to deposit a layer of hydroxylated graphene platelets 112 on the layer of aminated graphene platelets 108.

In one specific example, the membrane 100 can be fabricated as follows: The substrate 102 can be prepared by treating a polysulfone sheet with sulfuric acid and ions, as described above. Aminated graphene can be prepared as described above, and a suspension of the aminated graphene can be prepared by mixing 1 wt % camphor sulfonic acid (CSA), 100 ppm aminated graphene, and 0.2 wt % sodium dodecyl sulfate (SDS), and sonicating for 30 minutes. The suspension of aminated graphene can then be applied to the prepared substrate 102 (20 mL of suspension per $cm^2$ of substrate), and allowed to sit on the prepared substrate 102 (e.g. for one minute), until the suspension filters through the substrate 102. The substrate 102 and deposited aminated graphene platelets 108 can be allowed to dry. Next, a suspension of hydroxylated graphene can be prepared by exfoliating the hydroxylated graphene and dispersing it in water (1 mg hydroxylated graphene per mL water). The suspension of hydroxylated graphene can then be applied to the substrate 102 (20 mL suspension per $cm^2$ of prepared substrate), over the aminated graphene platelets 108. The water can be allowed to filter through the aminated graphene platelets 108 and substrate 102 until the membrane is dry. The membrane 100 can then be treated with heat, e.g. at 65 degrees Celsius for 5 minutes.

As mentioned above, the membranes disclosed herein can be used, for example, in water filtration and purification. For example, filtrate molecules can pass through pores or perforations in the graphene, as well as between adjacent graphene sheets in the platelets 108, 112, and between adjacent platelets 108, 112. Filtrate molecules can then pass through the pores 104 of the substrate 102. Larger ions, molecules, and particles will be retained by the graphene platelets 108, 112, as they will be too large to pass through the pores, between the graphene sheets, and between adjacent platelets 108, 112.

While the above description provides examples of one or more processes or apparatuses or compositions, it will be appreciated that other processes or apparatuses or compositions may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

EXAMPLES

Materials & Methods

One 4.7 cm diameter membrane was produced as a control, as described below. Two 4.7 cm diameter test membranes were produced, as described below.

Control Membrane:

A suspension of 8 ppm of graphene oxide platelets (from the "Graphene Superstore") in di-ionized water was created by sonification with 100 ppm of $AlCl_3$. A 47 mm diameter porous polysulphone (PSF) sheet was used as the substrate. A suspension volume sufficient to contain 62 mg of graphene oxide per $m^2$ was filtered through each substrate using 100 kPa pressure drop (atmospheric to vacuum). The substrates and deposited graphene oxide were then oven dried at 60C until dry.

Test Membrane:

STEP 113 Amination: 1 g of hydroxylated graphene powder was added to 50 mL of ethanol (0.02 g/mL), mixed for one minute, then sonicated for two hours. 2.5 g of ethylenediamine and 0.25 g of EDC was added to the mixture, and the mixture was stirred at room temperature for one hour. The mixture was filtered and washed with de-ionized (DI) water. The filtrate was dried at 80 degrees Celsius. The resulting aminated graphene was set aside.

STEP 2—Substrate treatment: A precursor substrate (4.7 cm diameter polysulfone polymer sheet, pore size less than 0.03 microns) was placed in a bath of deionized water (tank 1) for five minutes, removing any bubbles with careful agitation. The precursor substrate was removed from tank 1, and place in tank 2, containing an aqueous solution of 5.0 wt % $H_2SO_4$ at 80 degrees C. Bubbles were removed with careful agitation. The substrate was removed from tank 2, and placed in tank 3, containing an aqueous solution of 100 ppm $AlCl_3$, for two minutes. Bubbles were removed with careful agitation.

STEP 3—Manufacture of Membrane: A suspension of hydroxylated graphene in water (1 mg/ml) was exfoliated and dispersed using ultrasound. The suspension was filtered through the substrate (from STEP 2) until dry using a dead-end vacuum filter system (20 mL/$cm^2$ of hydroxylated graphene suspension per substrate area) to create a membrane of the substrate and hydroxylated graphene platelets. A solution/suspension mix of 1 wt % CSA, 100 ppm aminated-graphene (from STEP 1), and 0.2 wt % SDS was created and sonicated for 30 minutes. 20 mL/$cm^2$ of this solution/suspension was allowed to sit on the top surface of the membrane and hydroxylated graphene platelets for one minute. The solution/suspension was then drained from the substrate, and the resulting membrane was treated with heat at 65 degrees C. for 5 minutes.

Test Procedures:

Filtration Test: 5400 ppm of NaCl was added to 2L of deionized water. Salinity was checked using a TDS electrode meter (HACH). The membranes were mounted in a 4.7 cm vacuum filter. 50 mL of the NaCl solution was added to the membranes, and a vacuum was applied for one hour collecting the filtrate. Salinity of the filtrate was checked using a TDS electrode meter (HACH).

Durability Test: The membrane was mounted on a plate. A gasket with an inner diameter of 4.5 cm and outer diameter of 5.0 cm was positioned on-top of the membrane. This assembly was then bolted to an additional flat plate with a central hole of 4.5 cm diameter. Attached to the upper plate were a fluid input port and distribution baffles to ensure even flow across the sample surface. A water flow of 0.5 L/min was applied across the surface for a period of eight hours.

Results

The results of the durability tests are summarized in Table 1 (flow rates) and Table 2 (efficiency). Table 3 and Table 4 contain the raw data from the tests.

TABLE 1

Flowrates in L/hr/m² of membrane surface area based 10 tests for control, and 20 tests for the test membrane

| Test | Base-Line | | | 8 hr | | | Average |
|---|---|---|---|---|---|---|---|
| | Min | Ave | Max | Min | Ave | Max | Change |
| Control | 6.0 | 6.8 | 9.2 | 34.9 | 191 | 789 | 184 |
| Test Membrane | 4.4 | 7.4 | 9.9 | 4.6 | 7.5 | 9.5 | −0.1 |

TABLE 2

Efficiency of separation as filtrate concentration divided by source concentration

| Test | Base-Line | | | 8 hr | | | Average |
|---|---|---|---|---|---|---|---|
| | Min | Ave | Max | Min | Ave | Maxi | Change |
| Control | 90.8% | 91.6% | 92.8% | 1.9% | 3.9% | 6.3% | 86.3% |
| Test Membrane | 94.4% | 95.5% | 96.3% | 94.4% | 95.5% | 96.3% | 0% |

TABLE 3

Full results of tests on Control Membrane. 5400 ppm NaCl filtered at 700 kPa. Flow in mL/min.

| | Baseline | | After Durability | |
|---|---|---|---|---|
| | Flow rate | conc/TDS | Flow rate | conc/tds |
| 1 | 0.21 | 92.78 | 1.25 | 5.56 |
| 2 | 0.21 | 92.59 | 1.20 | 5.56 |
| 3 | 0.27 | 92.48 | 1.57 | 3.89 |
| 4 | 0.20 | 91.48 | 1.20 | 3.70 |
| 5 | 0.18 | 91.67 | 1.15 | 3.89 |
| 6 | 0.18 | 91.48 | 1.15 | 4.07 |
| 7 | 0.18 | 90.98 | 1.18 | 1.85 |
| 8 | 0.17 | 90.81 | 1.14 | 6.30 |
| 9 | 0.18 | 90.93 | 22.80 | 1.85 |
| 10 | 0.19 | 90.91 | 22.60 | 1.85 |

TABLE 4

Full results of tests on Test Membranes. 5400 ppm NaCl filtered at 700 kPa. Flow in mL/min

| | Baseline | | After Durability | |
|---|---|---|---|---|
| | Flow rate | conc/TDS | Flow rate | conc/tds |
| 1 | 0.27 | 94.44 | 0.27 | 94.63 |
| 2 | 0.29 | 94.81 | 0.27 | 94.81 |
| 3 | 0.23 | 95.19 | 0.22 | 95.09 |
| 4 | 0.22 | 95.19 | 0.21 | 95.22 |
| 5 | 0.20 | 95.46 | 0.19 | 95.52 |
| 6 | 0.20 | 95.74 | 0.19 | 95.70 |
| 7 | 0.21 | 96.17 | 0.22 | 96.28 |
| 8 | 0.20 | 96.19 | 0.22 | 96.15 |
| 9 | 0.20 | 95.74 | 0.20 | 95.76 |
| 10 | 0.13 | 96.11 | 0.13 | 96.15 |
| 11 | 0.21 | 94.63 | 0.22 | 94.44 |
| 12 | 0.28 | 94.44 | 0.26 | 95.00 |
| 13 | 0.22 | 95.37 | 0.23 | 94.91 |
| 14 | 0.20 | 95.37 | 0.23 | 95.19 |
| 15 | 0.21 | 95.46 | 0.20 | 95.46 |
| 16 | 0.21 | 95.74 | 0.20 | 95.74 |
| 17 | 0.19 | 96.11 | 0.23 | 96.11 |
| 18 | 0.21 | 96.20 | 0.22 | 96.07 |
| 19 | 0.20 | 95.93 | 0.22 | 95.57 |
| 20 | 0.20 | 96.30 | 0.21 | 95.96 |

Control membranes averaged a 91.6 efficiency with a flow rate of 6.8 L/hr/m2 of membrane under the test conditions. This may be suitable for most applications when two membranes are used in series. However, under cross-flow conditions approximating those found in reverse osmosis filters, the flow rate increased to over 100 L/hr/m2 and the efficiency dropped to less then 7%. These changes indicate a failure of the membrane.

Test membranes, i.e. those including hydroxylated and aminated graphene layers, averaged a better efficiency, at 95.5% for a 3.6% improvement at flow rates of 7.4 L/hr/m², or an improvement of 0.6 L/hr/m² over the control membranes. After the 8 hr cross-flow test, the average flow across the modified membranes remained essentially unchanged (slight decrease was not statistically significant, and the efficiencies had no noticeable changes).

We claim:

1. A membrane comprising:
    a. a porous polymer substrate;
    b. at least a first layer of graphene platelets supported by the porous polymer substrate, wherein the graphene platelets of the first layer comprise aminated graphene platelets.

2. The membrane of claim 1, wherein the first layer is directly on the porous polymer substrate.

3. The membrane of claim 2, further comprising at least a second layer of graphene platelets on the first layer of graphene platelets, wherein the graphene platelets of the second layer comprise hydroxylated graphene platelets.

4. The membrane of claim 2, further comprising at least a second layer of graphene platelets on the first layer of graphene platelets, wherein the graphene platelets of the second layer comprise hydrogenated graphene platelets.

5. The membrane of claim 2, further comprising at least a second layer of graphene platelets on the first layer of graphene platelets, wherein the graphene platelets of the second layer comprise non-functionalized graphene platelets.

6. The membrane of claim 1, wherein the porous polymer substrate comprises a polysulfone.

7. The membrane of claim 6, wherein the polysulfone has pores with a pore size of less than 0.03 microns.

8. The membrane of claim 6, wherein the polysulfone is an acid-treated polysulfone.

9. The membrane of claim 1, further comprising ions within the first layer, wherein the ions are intercalated between the graphene platelets of the first layer.

10. The membrane of claim 1, wherein the porous polymer substrate has pores, and the graphene platelets of the first layer at least partially fill the pores.

11. The membrane of claim 1, wherein the graphene platelets of the first layer have a diameter of at most 100 microns.

12. The membrane of claim 1, wherein the graphene platelets of the first layer are spaced apart to allow passage of filtrate between the graphene platelets of the first layer.

\* \* \* \* \*